United States Patent [19]

Carlisle

[11] 4,103,457
[45] Aug. 1, 1978

[54] HORTICULTURAL METHOD AND APPARATUS

[76] Inventor: Richard S. Carlisle, P.O. Box 307, Rye, N.Y. 10580

[21] Appl. No.: 714,818

[22] Filed: Aug. 16, 1976

[51] Int. Cl.$^2$ ............................................. A01G 1/00
[52] U.S. Cl. ..................,............................ 47/58; 47/41.11; 47/DIG. 2; 47/40.5; 47/59
[58] Field of Search ............ 47/DIG. 2, 58, 41, 41.11, 47/79, 57.5, 59, 63, 40.5; 229/7 R, 7 S; 128/214 D

[56] References Cited

U.S. PATENT DOCUMENTS

| | | | |
|---|---|---|---|
| 408,735 | 8/1889 | Moore | 47/DIG. 2 |
| 1,678,046 | 7/1928 | Holmes | 47/DIG. 2 |
| 2,453,906 | 11/1948 | Hamlet | 47/41.11 |
| 2,826,864 | 3/1958 | Bradley | 47/DIG. 2 |
| 2,838,789 | 6/1958 | Pazandak | 47/41.11 X |
| 2,938,304 | 5/1960 | Thomas et al. | 47/57.5 |
| 3,030,952 | 4/1962 | Elder | 128/214 D |
| 3,469,342 | 9/1969 | Morris | 47/99 |
| 3,842,539 | 10/1974 | Sacalis | 47/58 |

FOREIGN PATENT DOCUMENTS

| | | | |
|---|---|---|---|
| 156,466 | 9/1903 | Fed. Rep. of Germany | 47/41.11 |
| 184,006 | 7/1906 | Fed. Rep. of Germany | 47/41.11 |
| 956,277 | 1/1957 | Fed. Rep. of Germany | 47/41.11 |

*Primary Examiner*—Robert E. Bagwill

[57] ABSTRACT

The disclosed method and apparatus include steps and means for providing a supply of aqueous nutrient liquid to the cut end of each of one or more cuttings such as cut flowers and small branches for sustaining life processes, and for coupling the cut interface of each such cutting to the liquid supply. The lateral surface of each cutting is usually covered at and adjacent the cut end. This covering inhibits contamination and deterioration of the nutrient liquid during protracted periods of growth. For many kinds of cuttings, the nutrient liquid is applied to the ends of the cuttings at a distinctly higher pressure than that which is present incidentally at the cut ends of flowers in a vase.

19 Claims, 14 Drawing Figures

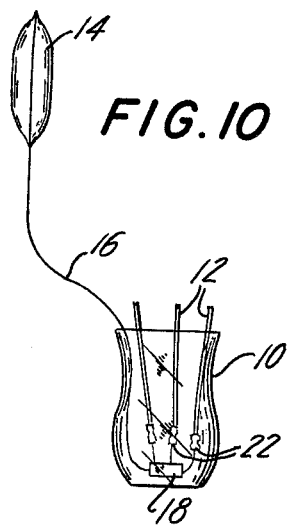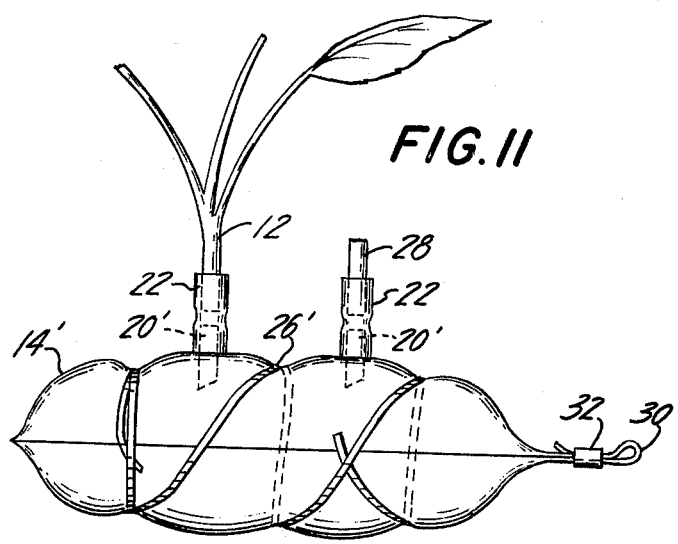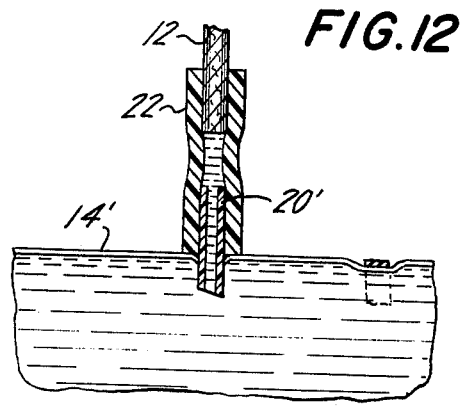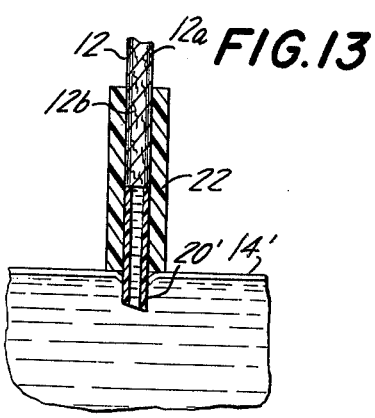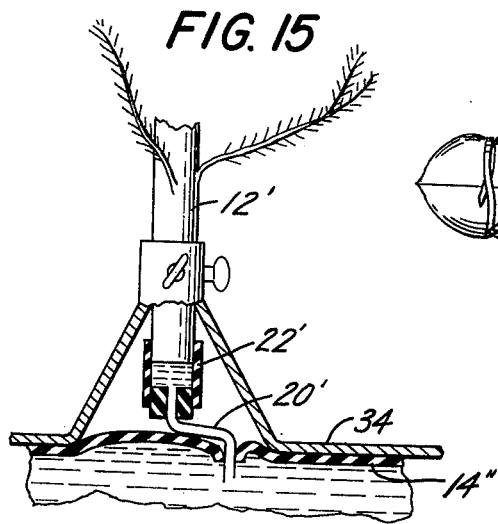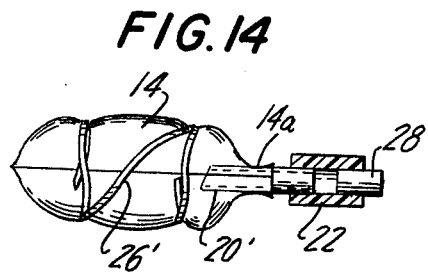

HORTICULTURAL METHOD AND APPARATUS

FIELD OF THE INVENTION

This invention relates to a method and apparatus for sustaining the growth of cuttings such as live flowers and branches.

BACKGROUND OF THE INVENTION

The common practice of sustaining the life of flowers by means of water in a vase is useful for only short periods of time. Costly flowers must be discarded all too soon. Water as the nutrient liquid is occasionally replaced by aqueous nutrient solutions. Some improvement is realized over the results obtained with water, varying with the species involved, but generally the life of cut flowers is not extended sufficiently to induce widespread consumer use of such nutrient fluids.

A variant of the practice of keeping flowers in water in a vase is applied to corsages. A vial of fluid is capped by a pierced rubber diaphragm and the stem(s) of the corsage is (are) forced through the hole in the diaphragm into the fluid. The arrangement avoids spilling of the water and is more convenient for that reason, but the freshness of the blooms has only a short life. Cut branches can sometimes be kept alive in water, and some species will even develop roots and grow. Those are special cases, exceptions to the more general experience of branches remaining alive perhaps longer than cut flowers, but usually losing their fresh natural appearance before long.

Flowers when used for decorating an outdoor space are often grown for the occasion and transplanted to the area to be decorated. Few kinds of cut flowers in water can withstand the demands imposed by the elements outdoors except for short periods.

Accordingly, it is an object of this invention to provide a new and improved method and apparatus for sustaining the life of cuttings. The novel method and apparatus are useful for extending the useful life of cuttings, or for adapting the cuttings to use in more varied surroundings, or for increasing the number of species of cuttings that can be kept fresh-looking, or for all these purposes.

A further object of the invention is to provide novel apparatus for sustaining cuttings in a variety of new display modes.

A further object of the invention resides in providing a novel method of causing cuttings to develop roots.

A further object of the invention resides in providing a novel method and apparatus for sustaining the growth of produce-bearing plants after cold weather sets in.

SUMMARY OF THE INVENTION

The present invention provides a novel system for nourishing a cutting or plant segment or scion, wherein nutrient liquid is fed directly and exclusively, or almost exclusively, to the cut interface.

The invention has two broad novel aspects, and these can be used together with remarkable success. In one aspect, cuttings have their cut ends coupled to a supply of nutrient liquid (water or a nutrient solution) and the lateral surface of each cutting is covered at least near the cut end to prevent prolonged exposure of the lateral surface to the liquid. One effect of the cover is to limit severely the possibility of the liquid becoming contaminated by pathogenic organisms present on the lateral surface of the cutting. As a second effect, the cover prevents free and prolonged exposure of the lateral surface of the cutting to the liquid, which could initiate progressive rotting of the cutting. It has also been discovered that the cover prevents development of roots which, were they to remain for long periods in the liquid, would tend to rot and induce rotting of the cutting. In a second aspect, nutrient liquid is supplied under pressure to the cut end. As demonstrated by success in prolonging the life and fresh, natural appearance of cuttings (which varies with different species as might be expected), the invention can achieve both of these effects. For example, fluid has been supplied by an elastic tube whose bore is slightly smaller than the diameter of a stem received in the tube; and in the case of a large variety of cut flowers, twigs and small branches supplied in this way, the fluid has remained clear over periods of weeks, even months. In contrast, it is a common experience to see the water in a vase of flowers becoming discolored, and it may even start to become putrid in a week or less. A snapdragon, when coupled in this manner to a supply of water containing a low concentration of minerals and maintained under pressure, became freshened indoors, and gradually the buds and leaves along the stalk developed and the stalk itself continued to grow. The original blooms stayed brighter for far longer than one has reason to expect of a cut snapdragon, and the development of the snapdragon continued unexpectedly over a period of months.

As a further aspect of the invention, various new modes of display of cut flowers and branches or twigs can become realities, as applications of the invention. For example, ordinary cut carnations coupled in the novel manner to a fluid supply have been "planted" outdoors together with the fluid supply, and have continued to thrive as if with roots in soil under ideal conditions. Blooms remained bright unusually long, buds developed into large bright flowers, and the leaves maintained an attractive healthy appearance. In another application, a variety of small branches of shrubs, including azalea, connected as described to a nutrient fluid supply with sustained fluid pressure, were arranged in a wide and shallow pot as a small imitation of a Japanese bonzai garden. Not only did the cuttings survive for many weeks indoors, but they grew and developed despite the limited available light.

As a further aspect of the invention, nutrient liquid can be supplied to the cut end of a cutting for prolonged periods, and the lateral surface of the cutting can be "air-layered" adjacent the coupling region for developing roots on the cutting. Air-layering is a known rooting technique that often takes much longer than the life of cuttings with their cut ends immersed in water.

As a further application of features of the invention, liquid nutrient can be supplied to cuttings during storage at low temperatures and while they are being transported.

It has been observed that natural nutrient substances develop in the upper portions of growing plants, which flow downward toward the roots. As a further aspect of the invention, the tubular cover about the lateral surface of the cutting at and near its end is extended beyond its end. As an approximation, this extension distance is at least equal to the diameter of the stem. In this way a small tubular mixing chamber is formed at the cut end for controlling dilution of the natural nutrient substances (flowing downward from the upper stem where such substances are produced) in the incoming nutrient liquid from the reservoir.

A highly effective means here provided for coupling nutrient liquid to the cut ends of scions, as a further feature of the invention, is a short length of elastic tubing, as of latex rubber, snugly fitted over the end portion of the scion, with only the cut end of the scion exposed to nutrient liquid in the bore of the tubing.

As a further novel feature, an exemplary form of nutrient liquid supply means for cuttings includes a collapsible pouch, and means for developing fluid pressure in the pouch. Additional to the important advantage of supplying fluid under pressure, the pressurized liquid can include dissolved oxygen. This can be introduced into the pouch and, when the pouch is squeezed, some oxygen is available both as a nutrient and for suppressing fermentation and consequent formation of potentially lethal substances in the liquid, such as alcohol.

The foregoing and other novel features and advantages of the invention in its various aspects will be better appreciated from the detailed description, below, of several embodiments shown in the accompanying drawings.

BRIEF DESCRIPTION OF THE DRAWINGS

FIG. 10 is a front elevation drawn to reduced scale of a further embodiment of novel aspects of the invention in FIGS. 1 and 2, including further novel aspects.

FIG. 11 is a lateral view of a further fluid supply means for plural cuttings, including a cutting.

FIG. 12 is an enlarged fragmentary longitudinal cross-section of a portion of FIG. 11.

FIG. 13 is a modification of FIG. 12.

FIG. 14 is a lateral view of a pouch containing nutrient liquid for cuttings.

DESCRIPTION OF ILLUSTRATIVE EMBODIMENTS

Figure 1:
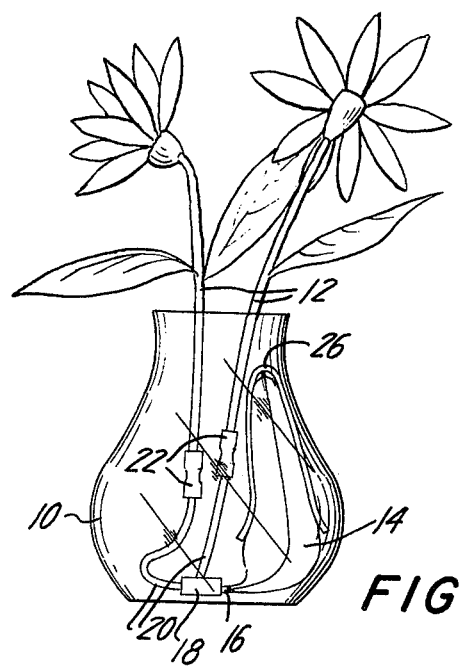
FIG. 1 is a view of cut flowers in a vase, further including fluid supply means as an embodiment of various aspects of the invention.

FIG. 1 shows a vase 10 containing two cut flowers 12 whose stems have cut ends coupled to a pouch 14 containing nutrient fluid. One tube 16 extends from pouch 14 to a manifold 18, and two tubes 20 extend from manifold 18 to coupling devices including tubes 22 at the cut ends of stems 14.

Pouch 14 in an example is formed of sheets of thermoplastic material heat-sealed together. Suitable materials are polyethylene, laminated polyethylene and nylon, and laminated polyethylene and aluminum; and a wide variety of other materials will be recognized as suitable.

The pouch has a neck 14a that is elongated and dimensioned for a water-tight fit about tube 16 as of polyvinyl chloride, an arrangement that has been found highly effective for present purposes.

Figure 6:
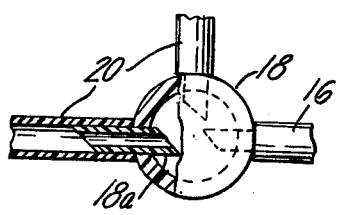
FIG. 6 is a top plan view, partly in cross-section, of a manifold in FIGS. 1 and 2.

Manifold 18 is here formed of a cylindrical side wall and flat top and bottom walls sealed together. Short tubular stubs 18a (FIG. 6) of any suitable resilient material, such as neoprene with a hardness of approximately 50 durometers, extend from the interior through the side wall of manifold 18 and project into tubes 16 and 20, respectively, connected to and interconnected by the manifold. The ends of the stubs are slant-cut to facilitate insertion.

Figure 3:
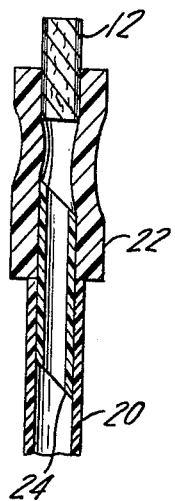
FIG. 3 is an enlarged longitudinal cross-section of an individual cutting and its fluid coupling means, as part of the embodiments shown in FIGS. 1 and 2.

In FIG. 3, the stem 12 has its cut end disposed inside one end of tube 22, and a stub 24 extends into the other end of tube 22 and into liquid supply tube 20, all of these parts forming means for coupling the supply of nutrient liquid to the cut end of the stem.

Tube 22 is formed of a water-impervious elastomer such as natural or latex rubber, or neoprene or other synthetic rubber. Surgical-quality latex rubber tubing is excellent for the purpose. The diameter of the stem is slightly greater than the bore of the tube before the stem is inserted. This tube 22 performs a number of functions. Being elastic, it maintains tension around the stem, and being readily deformable it tends to conform to surface irregularities around and along the stem. These quantities help to provide a secure liquid-tight grip of the stem in the tube. For example, a stem of about ⅛ inch diameter can be securely gripped by insertion of ⅛ to one inch of the stem, preferably ¼ inch, into a latex rubber tube having a wall thickness of 0.030 inch. The useful wall thickness of the elastic tube may vary widely, a practical range being 0.020 to 0.100 inch for tubes having a bore of ⅛ to one inch or more. This kind of fit of the tube against the lateral surface of the cutting forms a liquid-tight seal so that the supplied liquid does not leak or escape along stem 22. And by excluding the liquid from the lateral surface of the stem, diffusion of bacteria, fungi and other harmful material from the outside surface of the stem into the supplied liquid at the cut end of the stem is avoided. The protection afforded by tube 22 as a cover for the lateral surface of the stem forestalls contamination of the liquid. That contamination of the liquid which is closest to the cut end of the stem does not occur is demonstrated by the fact that the nutrient liquid (including tap water and a variety of aqueous solutions) has remained clear consistently in many test samples throughout the test period of weeks or months.

The formation of roots is suppressed, a desirable result inasmuch as roots which form in liquid and which remain in the liquid for a prolonged period tend to rot and induce rotting of the stem.

The elastic tubing alone achieves these purposes proficiently. Therefore supplemental measures for establishing a surface cover or seal have been found unnecessary. Substitute forms of surface covers or seals are contemplated but, as will be seen below, the use of a tube provides further benefits. Use of a wire tightened about the tube in such a manner as to develop localized crushing forces should be avoided. Where the exterior of a stem has a prominently scaly surface, it may be well to scrape the surface lightly preparatory to insertion of the stem into the tube. Coating the stem as with a water-impervious material such as rubber cement or wax and then freshly cutting the end of the stem before insertion into the elastic tube is advised only with stems having very irregular surfaces, such as chrysanthemums.

The use of a totally enclosed liquid supply system (represented in FIG. 1 by the pouch 14, manifold 18 and tubes 16, 20 and 22) protects the liquid from contamination that might otherwise result from entry of bacteria or other harmful material into the nutrient liquid from the environment. The use of a collapsible pouch as the reservoir is an exemplary way of providing a sealed system that continues to supply nutrient liquid to the cuttings during progressive depletion of the liquid without forming an air pocket in the liquid. A rigid reservoir with a movable piston is a more complicated and costly alternative.

That pouch 14 is collapsible has a further important advantage. As seen in FIG. 1, a heavy leaf-spring clamp 26 grips pouch 14. This develops pressure in the liquid and maintains pressure as the liquid supply is absorbed by the stems. There seems to have been no prior recognition of the value of pressure in the nutrient liquid in sustaining cuttings. A nominal amount of pressure is inherently present at the cut ends of flowers in a vase of water, namely the hydraulic pressure developed by the depth or head of water from its surface to the cut ends of the flowers. In terms of pressure, this head is proportional to the density of the liquid and the depth of immersion of the cut end. "Feet of water" and "inches of water" are common expressions for fluid pressure. Another form of expression for pressure is in terms of "atmospheres". An "atmosphere" is nominally 14.7 pounds per square inch. As used here, "pressure" (more precisely positive pressure) means pressure at the cut ends in relation to the pressure provided everywhere about the cuttings by the atmosphere. It has been discovered that by applying positive fluid pressure to cuttings, whether sustained continuously or during periods interrupted by periods of virtually no pressure application, many species of cuttings can be kept alive for longer periods than by immersion of the cut ends in water or other nutrient liquid, and the fresh appearance can be maintained longer than by such immersion, the improvement varying with different species.

Figure 7:
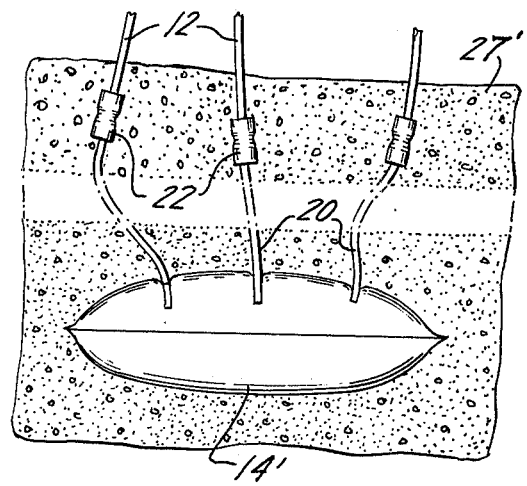
FIG. 7 is another embodiment of broad features of the invention of the embodiments of FIGS. 1 and 2, including further novel aspects.
Figure 5:
FIG. 5 is a transverse cross-section of the structure in FIG. 5 at the plane 5—5 therein.

The leaf-spring clamp 26 in FIG. 1 is an example of pressure-applying and pressure-sustaining means. Other forms of spring clamps have been used successfully. Where high pressure is desired, that is, high pressure-per-square-inch in the liquid, the area of bearing of the clamp against the surface of pouch can be limited. Where the force of the clamp is applied to a large area of the pouch, the fluid pressure that results is moderate. The pouch can be squeezed in other ways. A wrapping of a tensioned elastic strap (FIGS. 2 and 11) is a compact, distinctive and highly effective means for developing and sustaining pressure in the liquid for present purposes. FIGS. 7 and 10 illustrate other pressure-producing alternatives, described further below.

Figure 2:
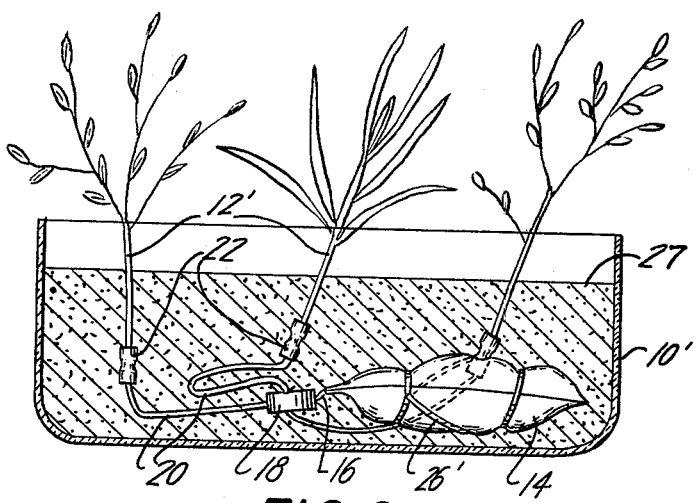
FIG. 2 is a vertical cross-sectional view of a modification of FIG. 1.

FIG. 2 shows a second mode of display for cuttings. The same numerals are used in FIG. 2 as in FIG. 1 for the same parts, and primed numerals are used for corresponding but different parts. In FIG. 2, a decorative wide-and-shallow dish 10' contains pouch 14 filled with nutrient liquid, main supply tube 16, manifold 18, individual tubes 20 and cuttings 12', all as described in connection with FIG. 1. A long piece of elastic strapping 26' is wound about pouch 14, stretched to develop substantial pressure in the liquid. Initially the pressure may be approximately one atmosphere, declining yet remaining substantial as the volume of liquid in the pouch is absorbed by the cuttings and the stretched length of strapping 26' decreases. The initially high pressure serves a particularly useful function relative to prevention of wilting as the cutting adapts itself to the chemistry of the nutrient liquid. This adaptation period may last from one to ten days or longer, depending on the plant species. In FIG. 2 the cuttings 12' are distributed in an attractive arrangement and held in position by suitable means. The position of the cuttings is maintained by the soil or sand 27 that is packed about lower end portions of the stems, the coupling tubes 22, and the supply tubes 20. The display of live cuttings in this way suggests a natural outdoor setting. Chosen and varied evergreen cuttings can be grouped to form a sort of Japanese bonzai garden. Cuttings of pine, cedar, blue and green spruce and yew can be used, as well as rhododendron, magnolia and azalea. Depending somewhat on the species of the cuttings, the arrangement can be more-or-less permanent. Many species of cuttings not only remain fresh-looking but grow over a period of months. Of course, the supply of liquid becomes depleted after a time, and may have to be renewed. This depends on many factors, such as the species of plant, the volume of liquid initially, the kind and number of cuttings in the arrangement, and the environment. Grown indoors (and thus away from heat and direct sunlight) and with species of coniferous cuttings supplied with nutrient liquid from a reasonably large pouch (one liter capacity, for example), the described arrangement of cuttings may not need attention for a two-month period or longer.

Figure 8:
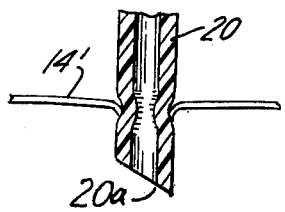
FIG. 8 is an enlarged fragmentary detail of the embodiment in FIG. 7.
Figure 9:
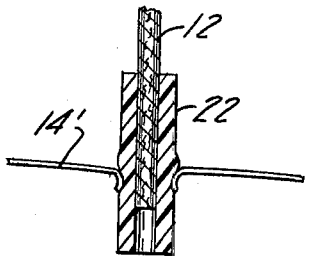
FIG. 9 is a modification of FIG. 8.

FIGS. 7–9 illustrate a modification of the apparatus in FIGS. 1 and 2, a still further mode of display of cuttings. In FIG. 7, live cuttings 12 are displayed outdoors in soil 27'. (The white horizontal area in the area of soil 27' represents an indeterminate depth of soil.) Pouch 14 is made of plastic films that are edge-sealed together thermally. The pouch may include a filling neck such as neck 14a (FIG. 4) or neck 30 (FIG. 11). Tubes 20 and elastic tubes 22 are assembled individually to the cuttings as in FIG. 3, but in FIG. 7 the tubes 20 extend directly into pouch 14'. Semi-rigid tube 20 in FIG. 8 (as of polyvinyl chloride or polyethylene) is forced through a small round hole in the pouch 14'. In an example, pouch 14' is made of 0.004 inch polyethylene laminated to an outer 0.001 inch nylon layer. Better still, by using tubes or tube endings 20a shaped as in FIG. 8 that are sharp and hard enough to have an edge (as of metal, styrene or other relatively rigid or hard plastic), such rigid-material tube can be forced against an unpierced area of the wall of the pouch when distended by liquid contents After locally stretching the wall, the tube enters the pouch and forms a seal against leakage. The arrangement of the tube and pouch as in FIG. 8 is satisfactory for sustaining cut flowers out-of-doors, relying only on the weight of the soil as the means for developing fluid pressure in the apparatus. Elastic strapping as in FIG. 2 may be included in case the soil is of a quality that becomes packed and therefore fails to maintain pressure against the walls of the pouch as the liquid supply becomes depleted. The elastic strapping 26 of FIG. 2 may also be useful in an outdoor arrangement such as that in FIG. 7 in case only a shallow depth of soil is used.

FIG. 9 shows a modification of the apparatus in FIGS. 7 and 8. Elastic tube 22 described in connection with FIGS. 1 and 3 extends through an undersized hole in pouch 14', tube 22 forming a liquid-tight seal to the wall of the pouch. Tubing 20 of FIG. 7 is omitted. Stem 12 extends into elastic tube 22 deeper than in FIG. 3, even penetrating past the level of the wall of pouch 14' in this illustration, for supporting the cuttings upright. The attractive appearance of the display where the coupling configuration of FIG. 9 is used is completed by embedding the pouch in shallow soil. The upright support of the stem provided by tube 22 in FIG. 9 is supplemented by the covering layer of soil.

The apparatus of FIG. 7 may be used to supply nutrient liquid to a plant cutting under a wide range of fluid pressure. If the covering soil 28' is replaced by extremely light-weight material, such as vermiculite, then the fluid pressure at the base of the cutting will be of negative value, due to the elevated height of the cutting base above the main fluid reservoir. Thus, a negative hydraulic head is made possible with this apparatus. Supplying liquid nutrient under a negative hydraulic pressure has been shown to be useful in maintaining small branches of fruit-producing plants, such as grape vines and apple, plum and cherry trees. The woody stems of such species apparently have an exceptional ability to draw liquid toward the leaves as it is transpired therefrom. This is explained in the botany literature as due to a well-known "cohesive-force" principle. Supplying certain nutrient liquids to these fruit species under a substantial positive hydraulic pressure tends to oversaturate the leaves and cause water spotting, which in turn leads to browning and wilting of the leaves. The fluid pressure developed at the cut ends of cuttings may be made positive or negative (above or below atmospheric pressure) in varying degrees depending on the height of the pouch or other container in relation to the cut ends (compare FIGS. 7 and 10) and by using or omitting a supplemental means for applying pressure to a sealed pouch serving as a reservoir for the nutrient liquid.

The arrangements in FIGS. 2, 7 and 8 and the modification in FIG. 9 represent improved means for displaying cut flowers outdoors. Larger sized pouches should be used in outdoor displays than indoors, since high temperature and direct sunlight increase the rate of transpiration, and dissipation of the liquid supply. Depending on the species of cuttings, a ten-times increase in the rate of dissipation may be experienced in outdoor displays compared to the required volume of liquid for the same cuttings indoors.

FIG. 10 shows a further mode of display. The arrangement is the same as in FIG. 1, except that spring clip 26 of FIG. 1 is omitted and pouch 14 is suspended for providing sustained hydraulic pressure. This arrangement may be advantageous where the pouch can be concealed, as behind draperies. The degree of collapse of the pouch shows how much of the liquid has been used up. An emptied pouch can be refilled, or an empty pouch can be discarded and replaced by a filled one.

FIG. 11 shows a modification of the embodiment of FIG. 2, and includes further novel features. The same numerals are used in FIG. 11 to designate parts that are the same as in FIGS. 1, 2 and 7. Cutting 12 in FIG. 11 is received in elastic tube 22, as in FIGS. 1 and 2, but a short tubular stub 20' extends from tube 22 through an undersize hole in pouch 14'. The lower end of tube 22 rests on pouch 14' and may help to maintain cutting 12 erect. Stub 20' may be formed to pierce the pouch.

It is to be understood that while only two tubes 20 are shown, pouch 14' in FIG. 11 can be made large enough to accommodate many cuttings. The outer end of coupling tube 22 at the right in FIG. 11 is closed off by a plug 28 whose diameter is a little larger than the normal (when empty) bore of tube 22. Plug 28 can withstand considerable pressure that may be developed by tensioned elastic strapping 26'. When a cutting is to be inserted in place of a plug 20, tube 22 can be squeezed flat in the space between tubular stub 20' and plug 28. This seals tube 22 against escape of liquid contained in the pouch under pressure. Plug 28 can then be removed and a cutting can be inserted into the tube. One cutting can be substituted for another in the same way.

The pouch of FIG. 11 has a filling neck 30 and a clip 32 that holds neck 30 folded and thus securely sealed against leakage despite potentially high values of internal pressure. Pouch 14' can be filled with liquid, and refilled as may be required, with strapping 26' preferably absent while the pouch is being filled, and with a cutting 12 or a plug 28 blocking the outlet end of each coupling tube 22. Thereafter neck 30 is folded on itself and clip 32 is applied to seal the filling neck, and elastic strap 26' is wound about the pouch in tension to develop suitable fluid pressure.

The pouch and tubes 22 of FIG. 11 with a plug 28 in each tube 22 can be sold as a complete unit, without any cuttings. The same apparatus can be sold by a florist with selected cuttings in each of the tubes 22. The nutrient liquid in the pouch of FIG. 11 — and indeed in each of the pouches described — can be any of a variety of formulations that have been developed for cuttings of various species. Where the pouch contains a prescribed nutrient liquid for particular cuttings, it may be simplest practice for the pouch to be replaced entirely when its contents are used up. A replacement pouch of nutrient liquid would have each of its tubes 22 sealed by a plug 28. Filling neck 30 may be permanently heatsealed or eliminated entirely. The replacement pouch filled with nutrient liquid may be equipped with elastic strap 26', wound in tension about the pouch. The user (either a florist or the retail purchaser) can squeeze and thereby seal each tube 22, and then replace one or more plugs 28 with cuttings 12.

Figure 4:
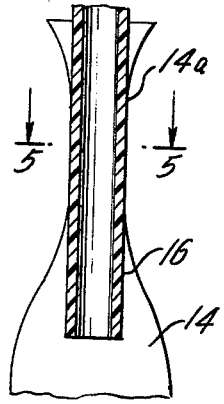
FIG. 4 is an enlarged fragmentary view of another portion of the embodiments in FIGS. 1 and 2.

To provide a structure able to withstand rough handling and very high internal fluid pressure, a tight-fitting tube can be inserted between parallel segments of neck 30 like the neck 14a of FIG. 4. Insertion of the tube can be aided by use of an aqueous lubricant. The nutrient liquid itself being helpful in this respect. As an alternative, rubber-base adhesive or plastic cement can be used for lubricating the tube and the neck to aid in insertion of the tube, and for thereafter sealing the tube in the spout. Indeed, this may be the preferred practice used at the factory.

As seen in FIG. 14, a short length of tube 20' can be permanently sealed to the filling neck of the pouch; an elastic coupling tube 22 can be force-fitted onto one end of the short tube 20', and a plug 28 may be force-fitted into the opposite end of the coupling tube 22. The user may then squeeze flat and seal the elastic coupling tube 22 in the space between the plug 28 and tube 20', and another length of tubing 16 or 20 can be inserted where plug 28 was removed. This tubing 16 or 20 can extend to a manifold 18 or to another coupling tube 22 for a cutting 12.

In a distinctive application of features of the invention, the pouch of FIG. 14 can be proportioned for use as a source of liquid nutrient for a boutonniere or a corsage, and in that case a cut flower can be inserted in place of plug 28.

In any of the described forms of nutrient liquid supply, there is a possibility of air being trapped in coupling tube 22 or in tubing connected to the coupling tube 22. The air forms a bubble, and it may advance toward the cut end of the stem in coupling tube 22 as the cutting absorbs the liquid. Such a bubble could block absorption of liquid by the cutting. Care during the filling procedure can avoid such an air bubble. When a manifold 18 is used, it serves as a trap for such air bubbles.

An air bubble in the pouch, or a bubble of oxygen in the pouch, can be helpful in that, when the liquid and a bubble of air or oxygen are charged into the pouch, and where pressure is developed by elastic strap 26' or other pouch-squeezing means, some of the bubble is forced into solution in the aqueous nutrient liquid. A relatively high oxygen content in the liquid tends to retard fermentation of any carbohydrate that may be present in the liquid, whether part of an aqueous nutrient solution or emitted by the cutting. Fermentation could render the solution harmful to the cuttings because of toxic by-products of the fermentation such as alcohol.

The arrangement of tubes projecting into the pouch as in FIGS. 7-9 and 11-14 enables such tubes to dip into the liquid through an air or oxygen bubble that may be present, to avoid entry of a bubble (rather than liquid) into the passage leading to the cutting.

Where air or oxygen in the nutrient liquid is found significant, the material of which the thin-walled pouch is formed also becomes significant. Some plastic films are permeable to gasses. A heat-sealable film serving as an effective barrier to the escape of oxygen is the nylon-polyethylene laminate mentioned above. The polyethylene layers of the films forming the pouch face inward, so that the films can be heat-sealed together. A layer of Saran may also be added, to enhance the barrier quality.

A further feature common to each form of apparatus shown in the drawings and described above may best be described in connection with FIG. 13, being the same in all respects as FIG. 12 except that stem 12 in FIG. 13 is pressed against the end of tube 20'. Stem 12 is seen to include an outer layer 12a (technically called phloem) on a core called xylem 12b. Absorbtion of liquid takes place largely through the xylem, and substances produced by a plant flow downward along the phloem. To the extent that cuttings of various species may depend on these substances, the configuration of FIG. 13 provides an advantage. The upper end of tube 20' abuts the phloem, thus inhibiting the emission of downward-flowing substances while the confined volume in the upper end of tube 20' tends to mitigate dilution of substances emitted by the cutting into the nutrient liquid. Another factor that limits downward diffusion of any such emissions into the volume of nutrient liquid in tube 20' at the end of the scion is the internal fluid pressure of the liquid nutrient. The emitted substances become reabsorbed to some extent as they are mixed with the incoming liquid flowing up to xylem. This situation contrasts with the customary free exposure in water of the cut ends of flower stems where, because of virtually unlimited dilution, any fluids emitted at the cut ends cannot be conserved for nutritive reabsorption. Like FIG. 13, each of the described arrangements includes a length of tubing at the cut end of the stem that inhibits dilution of the emitted fluid, so that the xylem absorbs nutrient liquid enriched by the emission from the phloem. This situation exists even in FIG. 9, where tube 22 projects beyond the cut end of the stem to form a mixing chamber for the nutrient liquid and the emitted fluid. The length of the chamber should at least equal its diameter.

The following example is a modest demonstration of wholly unexpected results that can be realized from use of features of the invention. Two sprigs of carnation cut from the same plant, bearing bright red flowers and green leaves, were kept indoors under identical conditions of temperature and light. The cut end of one sprig was kept in three inches of tap water, while the cut end of the other sprig was held in an elastic tube 22 of natural rubber, coupled to a collapsible pouch, with tap water under pressure developed by a tensioned elastic band about a pouch containing the water, as in FIGS. 1 and 3, or using pouch 14 in FIG. 14. At the start, the fluid pressure was approximately one atmosphere, diminishing somewhat as the supply of liquid in the pouch was absorbed. The blossoms of the sprig supplied with tap water under pressure lasted ten days. The red blossom color was maintained to the end of the period, and the leaf color and appearance remained normally fresh and green thereafter. The other sprig, with the cut end immersed in a vase containing tap water as described, lasted eight days, but progressively lost the color and fresh appearance of the blossoms and the leaves during that time.

As a further feature of the invention, a cutting can be rooted by "air-layering" while sustaining the cutting as described above. "Air-layering" is commonly reserved for use with rooted host plants. Here, a cutting may be equipped with an "artificial root" comprising parts 14, 20 and 22 in FIGS. 2 and 3 and thus supplied with nutrient liquid. A segment of the cutting above coupling tube 22 is embedded (as by a wrapping) in soil or another rooting medium such as spagnum moss that is kept moist. A cutting of a tomato plant was rooted in this manner. Roots did not develop at the cut end, so there was no problem of roots remaining in liquid for a prolonged period. Instead, when the induced roots above the coupling have developed sufficiently, the cutting can be readily transplanted. The system of FIG. 7 can be used similarly for root-development indoors or outdoors, the cuttings being embedded in moist soil above coupling tubes 22. This system can be used advantageously to avoid the step of transplanting. When roots develop, the "artificial root" apparatus can be left in place or, if desired, reclaimed, using care to leave the rooted cutting, now a plant, in situ.

Various forms of apparatus, including those described above as well as further modifications, can be used to preserve the fresh condition of conifers of the type used as Christmas trees. This reduces the fire hazard that normally develops when a tree has been up for 10 days or more.

In a further modification, apparatus as in FIGS. 7 or 10 can couple the cut end of the tree to nutrient liquid in a pouch. As shown in FIG. 15, this may include a latex rubber tube 22 covering the lateral surface adjacent the cut end, and a tube 20' coupled to the pouch 14" in any suitable manner, as in FIG. 8 for example. A collar or a circular transverse platform 34 may be secured to the tree and arranged to press downward on the flexible pouch 14" that forms the reservoir. The weight of the tree itself then serves to impart a desired level of internal positive pressure for the nutrient liquid. Alternatively, a container of nutrient liquid may be suspended as in FIG. 10 from a concealed point and coupled to the base of the cut tree for conducting the liquid to the cut end of the tree under pressure as a result of the hydraulic head. The height of the container should be in the range of one-half of the tree to thirty feet above the cut end, a recommended height being about three feet above the cut end of the tree for trees up to about six feet tall, higher for taller trees.

A further distinctive application of the described method and apparatus for sustaining the growth of cuttings is for extending the growing period of produce-bearing plants after cold weather sets in. For example, parts of a tomato plant bearing immature tomatoes may be cut from the rooted plant, coupled to nutrient liquid as variously described above, and moved indoors to milder temperatures with sufficient light. As a further alternative, the lateral covering about the cutting, especially a tomato cutting, can be altered to expose a short length of the stem, adjacent the cut end, to the liquid. With a supply of nutrient liquid maintained at the cut end, the cutting is sustained. Roots tend to develop adjacent the cut end, thus enabling the rooted cutting to be transplanted.

Success is promoted by virtue of a limited size open-ended chamber formed by tubing at the cut end of the cutting as shown for example in FIGS. 3, 9 and 12. Nutrients emitted by the cutting are conserved for absorption into the cutting together with the nutrient liquid being absorbed. For this purpose the chamber should have a cross-sectional area limited to about four times the cross-sectional area of the cut end and the minimum length of the chamber should be about equal to the diameter of the chamber. Since the term "diameter" applies technically to a circular shape, the term "average transverse dimension" is useful as a more general term to apply also to non-round stems that cause the bore of the chamber-forming tube to be distorted out of its ordinarily round shape. The actual value of the average transverse dimension is the average length of a great number of random centerlines projected across the bore.

Each of the described systems is "closed", meaning that the nutrient liquid is enclosed against all exposure except to the ends of the cuttings. This has the advantage of protecting the liquid against contamination from the environment, a particular concern where aqueous nutrient solutions are used having a composition that may be affected by entry of bacteria and mold spores, etc.

What is claimed is:

1. A method of sustaining life processes of a cutting such as a living branch or flower, including the steps of providing in a collapsible reservoir a wholly enclosed supply of liquid suitable for maintaining viability of said cutting and conducting the liquid through an unobstructed liquid delivery and coupling means to essentially all of the cut end of the cutting, the liquid delivery and coupling means including an elastic sleeve of water-impermeable material at the delivery end thereof remote from the collapsible reservoir, and applying said resilient sleeve in tension about all of that portion of the lateral surface of the cutting which is at and adjacent to the cut end of the cutting for forming a leak-preventing cover thereon and the resilient sleeve having a portion extending beyond said cut end, such that only the cut end of the cutting is in contact with the liquid in the extending portion of the elastic sleeve, said reservoir collapsing as the cutting absorbs liquid.

2. The method in accordance with claim 1, further including the step of developing positive fluid pressure at the cut end of the cutting.

3. The method in accordance with claim 1, further including the step of maintaining a confined volume of liquid at the cut end of the cutting having an average transverse dimension no greater than about twice that of said cut end and a minimum length about equal to the average transverse dimension of said confined volume.

4. The method in accordance with claim 1, including the step of adjusting the relative level of the reservoir and the cutting to maintain a small negative fluid pressure at the cut end of the cutting.

5. The method as in claim 1 including the step of implanting a portion of the cutting extending from the leak-preventing cover in moist material suitable for root growth so that a cutting can be sustained during an extended period of time to enable roots to develop from said extending portion of the cutting.

6. In combination, a live cutting and means for supplying liquid to the cut end of the cutting, said supplying means including a collapsible reservoir of liquid suitable for maintaining viability of said cutting and unobstructed liquid delivery and coupling means one end of which extends from the reservoir to essentially the entire cut end of the cutting, said delivery and coupling means including an elastic sleeve of water-impermeable material in tension about the cutting and forming a leak-preventing cover on the lateral surface of the cutting at and near its cut end and extending beyond its cut end, such that only the cut end of said cutting is in contact with liquid in said elastic sleeve, said reservoir collapsing as the cutting absorbs liquid.

7. Apparatus in accordance with claim 6 wherein said liquid delivery and coupling means forms an open-ended chamber whose transverse cross-sectional area is a maximum of about four times the cross-sectional area of the cutting and whose length measured from the cut end is a minimum of about the average transverse dimension of the confined volume.

8. Apparatus in accordance with claim 6 including means providing positive fluid pressure at said cut end.

9. Apparatus in accordance with claim 6 wherein said reservoir includes a collapsible pouch closed against exposure of its contents to the atmosphere.

10. Apparatus in accordance with claim 9 further including means for applying a sustained pressure to said pouch despite gradual depletion for maintaining pressure in the liquid therein.

11. Apparatus as in claim 9, further including at least one additional cutting and one additional liquid delivery and coupling means all as aforesaid, each said liquid delivery and coupling means being individually connected to said pouch through a respective hole therein.

12. A combination as in claim 9, further including resilient means bearing against the pouch for sustaining pressure of the liquid against the cut end during depletion of the supply of liquid in the pouch.

13. A combination as in claim 9, further including means causing the cutting to apply its weight to the collapsible pouch for developing fluid pressure in the pouch and at the cut end.

14. Apparatus in accordance with claim 13, wherein said means is arranged to accommodate downward shift of the cutting as said upper wall portion of the pouch is allowed to descend by virtue of progressive depletion of the liquid.

15. Apparatus in accordance with claim 6 including means to provide a fluid pressure range extending from negative to positive.

16. Apparatus as in claim 6, wherein said liquid delivery and coupling means includes a manifold interposed therein, said manifold having plural outlets for a corresponding plurality of cuttings.

17. The combination as in claim 6, wherein said liquid delivery and coupling means further includes a tube extending into the portion of said sleeve that extends beyond said cut end of the cutting.

18. In combination, a live cutting, a collapsible pouch for containing liquid suitable for maintaining viability of the cutting, the pouch enclosing the liquid against exposure to the atmosphere, a sleeve of elastic water-impermeable material in tension about the cutting at and near the cut end thereof for forming a leak-preventing cover on the lateral surface of the cutting, said sleeve having a portion extending beyond said cut end to a point adjacent a wall of said pouch, and a tube having one end which extends into said extending portion of the sleeve and said tube having another end joined to a wall of the collapsible pouch and opening into the interior thereof, such that only the cut end of the cutting is in contact with liquid in said sleeve, and said pouch collapsing as the cutting absorbs liquid.

19. The combination as in claim 18, wherein said wall of said pouch is formed of plastic film and wherein said tube forms a seal to said wall resulting from being forced from outside the pouch to the interior thereof through said wall.

* * * * *